United States Patent Office 3,483,158
Patented Dec. 9, 1969

3,483,158
FLAME-RETARDANT RESINOUS COMPOSITIONS
Harry H. Beacham, Severna Park, and Nicholas R. Segro and James L. Thomas, Baltimore, Md., assignors to FMC Corporation, New York, N.Y., a corporation of Delaware
No Drawing. Filed June 2, 1966, Ser. No. 554,669
Int. Cl. C09k *3/28*
U.S. Cl. 260—41                                     7 Claims

ABSTRACT OF THE DISCLOSURE

This specification discloses compositions of diallyl chlorendate which have been converted to an essentially cured condition in the presence of antimony oxide and compositions in which such "gelled" diallyl chlorendate is compounded with diallyl phthalate prepolymers to make flame retardant, fast curing, diallyl phthalate molding compositions.

---

This invention is concerned with the production of diallyl phthalate molding compositions which resist burning, and aims to provide such compositions by incorporation therein of antimony oxide and an insolubilized form of a polymer prepared by the polymerization of a diallyl ester of a Diels-Alder adduct of hexachlorocyclopentadiene with an unsaturated dibasic carboxylic acid.

The molding compositions prepared from the various diallyl phthalates have found extensive use, particularly in electrical applications where it is desirable to maintain good electrical properties when wet. There has, however, been considerable difficulty in flameproofing these compositions to meet the need for flame-retardant electrical insulating compositions. The problem has been that of getting the desired flameproofing without sacrifice of the desirable electrical properties and without sacrifice of the very desirable precision molding properties characteristic of diallyl phthalate molding compositions.

It has been proposed to render diallyl phthalate molding compositions flame-retardant by the use of the allyl esters of polybasic acids derived from the Diels-Alder condensation of hexachlorocyclopentadiene with various unsaturated polybasic acids. One such acid is described in United States Patent 2,810,712. This anhydric acid, which is prepared by the Diels-Alder condensation of hexachlorocyclopentadiene and maleic anhydride, is known as chlorendic anhydride; chemically it is 1,4,5,6, 7,7 - hexachlorobicyclo - (2.2.1) - 5 - heptene - 2,3 - dicarboxylic acid. A similar anhydride can be prepared from hexachlorocyclopentadiene and tetrahydrophthalic anhydride; this is described in United States Patent 3,196,- 191, and identified chemically as 1,2,3,4,9,9-hexachloro- 1,4,4a,5,6,7,8,8a - octahydro - 1,4 - methanonaphthalene- 6,7-dicarboxylic anhydride.

Flameproof compositions have been made and used in which diallyl phthalate prepolymer molding compositions have been rendered sufficiently flameproof to meet the typical military specification M–14F. Unfortunately, the flameproof compositions made in this fashion do not give equivalent performance to similar compositions made without the flameproof additives. A rather high level of the diallyl ester of the chlorinated acid must be used, of the order of about 7½%, and the same weight of antimony oxide must be used with it to meet this military specification. When such large amounts of additives are used, the electrical properties are substantially impaired. Moreover, there is marked shrinkage in molding, retarded cure, and a tendency for the compositions to stick in the molds.

We have now discovered that when a diallyl ester of a dibasic acid which is formed by the Diels-Alder addition of an unsaturated dibasic acid, such as maleic anhydride or tetrahydrophthalic acid, to hexachlorocyclopentadiene, is mixed with a filler in substantially any proportion and converted to the insoluble stage, under such conditions that the resin does not separate from the filler, a product is obtained which can be blended with antimony oxide and diallyl phthalate prepolymer molding compositions, and which will impart flame-retardance to these compositions with minimum quantities of both the chlorinated polymer and the antimony oxide, so that the resultant compositions retain the excellent molding of the basic diallyl phthalate polymers, and at the same time, the excellent electrical properties are largely maintained. Despite the fact that the flame-retarding material has been insolubilized apart from the diallyl phthalate in the system, it imparts flame-retardance more effectively than when it is added in monomer form.

For example, in a typical glass-filled molding composition made from diallyl isophthalate prepolymer (the intermediate stage acetone-soluble polymer prepared by the conventional technique of polymerizing diallyl isophthalate short of gelation to a solution of soluble polymer in monomer, followed by separation from the monomer by solvent extraction or other known technique) a total of about 7½% of the total molding composition of diallyl chlorendate monomer and about 7½% of antimony oxide is needed to meet the typical military specification M–14F. The same specification can be met using only 9% of a composition made by gelling 4½ parts of diallyl chlorendate on 4½ parts of Oncor 23A (a silica-antimony oxide pigment containing 50% antimony oxide, hence 2¼ parts of antimony oxide). This means that the resultant products are more nearly equivalent to the unmodified diallyl isophthalate molding compositions electrically and in other properties, or can be made more flame-retardant if desired.

Not only is the use of less material possible, but some of the molding difficulties with prior art compositions are avoided. Milling performance is much better, there being no sticking or mold fouling; there is no blocking of granular compounds as occurred with prior art flame-retardant materials, and the cures are more uniform. Moreover, it will be noted that the results were obtained with only half as much antimony oxide as in the prior art usage so that this important source of degraded electrical properties is substantially lessened.

The utility of the gelled resin in conjunction with a second molding resin has been suggested in co-pending application SN 270,175, filed Apr. 3, 1965, in which it is also disclosed that it is possible to make molding compositions which have good flame resistance by insolubilizing diallyl chlorendate on a filler, to produce a material which can be blended with unsaturated polyesters to produce molding compositions which have some measure of flame retardancy. In that application it is disclosed that in order to obtain these results, it is necessary that the ratio of filler to polymer be at least equal to the ratio at which the oil absorption of the filler is just satisfied by the polymer from which the monomer is derived. However, that application does not disclose the unexpected improvement in flame retardancy of the compositions when used in conjunction with diallyl phthalate resins, nor does it disclose their synergistic action with antimony oxide.

Most preferably, the filler of choice is the antimony oxide, used to help impart flame resistance, or a modified antimony oxide, such as the National Lead Company's Oncor 23A which contains 50% silica, 5% antimony trioxide, and 45% antimony tetroxide. In general the antimony oxide is used in approximately the same proportion by weight as the flame-retardant resin; we may, however, vary the proportion from about 50 to about 150 parts per hundred parts of resin.

In preparing the flame retardants of this invention, we may mix the monomer with the antimony oxide and sufficient additional filler so that there is at least sufficient filler present to secure the amount at which its oil absorption is just satisfied by the monomer, or we may use less filler, thus not satisfying the oil absorption.

In the case where the filler is in sufficient concentration to satisfy the oil absorption, we use the procedures outlined in co-pending application SN. 270,175 where the materials are mixed together with a peroxide or other catalyst and heated in an oven for a sufficient time to produce a cake converted to the solvent-insoluble stage, after which the cake is ground to produce the finished product.

Where insufficient material is used to satisfy the oil absorption of the monomer, a different procedure must be used in order to prevent separation of the insolubilized polymer from the filler. In this procedure, the mixture of filler, catalyst, and monomer is placed in a heavy-duty mixer and polymerization is carried out with stirring until the mixture becomes rubbery. At this point, the mixture may be discharged from the mixer and the material cured in an oven without separation of polymer from the filler, following which it is ground to the desired particle size. Alternatively, mixing in the heavy-duty mixer may be continued until the filler-resin mixture solidifies and crumbles. It is then removed from the mixer, cooled, and ground to the desired fineness.

As indicated above, the proportion of insolubilized filler in the finished composition will vary depending on the degree of flame retardance desired, bearing in mind the desirability of retaining the best electrical properties, and can be varied within substantial limits. A favorable improvement in flame retardance is observed with as low as 2% of the gelled chlorinated polymer and 1% by weight of antimony oxide, based on the total compositions. If one goes substantially above about 10% of gelled resin and 10% of antimony oxide, the electrical properties are seriously impaired.

The molding compositions can be made in known fashion, treating the ground gelled polymer-filler composition in the way one ordinarily treats an ordinary filler.

The following are typical examples of the invention. They are given here by way of illustration and not by way of limitation.

EXAMPLE 1

Cake prepared at oil absorption level with antimony oxide

|  | Parts by wt. |
|---|---|
| Diallyl chlorendate (DAC) | 32.6 |
| Antimony oxide | 32.6 |
| Calcium silicate (Wollastonite) | 34.8 |
| tris(Methoxyethyl)vinyl silane | 1.0 |
| tert Butyl perbenzoate | 1.0 |

This mixture of ingredients formed a thick dough when blended in a Hobart mixer. This was spread on a flat stainless steel tray (about 0.5 inch thick) and baked for two hours in a circulating air oven set at 120° C. The cured cake consisted of a hard but friable slab. It was broken up and ground to a minus 200 mesh particle size in a ceramic ball mill for later compounding into molding compositions.

For preparation of a molding compound the following ingredients were combined in a Patterson Kneadmaster mixer.

|  | Parts |
|---|---|
| Diallyl orthophthalate prepolymer (Dapon 35) | 875 |
| Acetone | 700 |
| Glass fibers (¼ inch) | 900 |
| Wollastonite | 63 |
| t-Butyl perbenzoate | 20 |
| tris(Methoxyethyl)vinyl silane | 12 |
| Ground gelled composition | 352 |
| Calcium stearate | 20 |

The diallyl orthophthalate prepolymer was a commercial grade (Dapon 35) prepared by polymerizing the monomer to a point just short of gelation, and then separating the solution prepolymer from the monomer by treatment with methanol to dissolve the soluble monomer away from the methanol insoluble prepolymer. After thorough mixing the composition was spread on trays and allowed to air dry overnight. It was then processed on a heated two-roll rubber mill. Within three minutes a sheet could be stripped cleanly from the mill, which solidified on cooling and was ground in a Wiley mill yielding a dry granular molding powder which did not block on storage at temperatures in excess of 95° F. The compound molded well by both compression and transfer techniques. Repeated molding continued to produce molded parts of high surface definition and with no sign of sticking or mold fouling.

EXAMPLE A (FOR COMPARISON)

A compound of identical total composition of Example 1 was prepared by combining the following in a Patterson Kneadmaster.

|  | Parts |
|---|---|
| Dapon 35 | 875 |
| Acetone | 700 |
| Glass fibers (¼") | 900 |
| Wollastonite | 186 |
| Antimony oxide | 115 |
| t-Butyl perbenzoate | 25 |
| Diallyl chlorendate monomer | 115 |
| tris(Methoxyethyl)vinyl silane | 12 |
| Calcium stearate | 20 |

Mixing and solvent removal were carried out as before. However, when the compound was placed on the rubber mill, extreme difficulty was experienced in obtaining a milled sheet which could be stripped cleanly from the rolls. After about seven minutes a rubbery sheet was removed, cooled, and ground. The resulting molding powder exhibited strong blocking tendencies on storage and required regrinding before it could be fed into a molding press. Cure time for the compound was somewhat longer than for the material of Example 1, and on repeated transfer moldings of a ½" x 5" bar a deposit was found building on the mold cavity wall which soon destroyed the surface appearance of molded parts and eventually caused parts to stick in the cavity.

EXAMPLE 2

Procedure of Example 1 with modified antimony oxide

|  | Parts by wt. |
|---|---|
| Diallyl chlorendate | 32.6 |
| Oncor 23A | 32.6 |
| Wollastonite | 34.8 |
| tert Butyl perbenzoate | 1.0 |
| tris(Methoxyethyl)vinyl silane | 1.0 |

Procedure as in Example 1, including the same formula molding compound.

EXAMPLE 3

Two-step gel formation at levels below oil absorption level

|  | Parts by wt. |
|---|---|
| Diallyl chlorendate | 1000 |
| Oncor 23A | 1000 |
| Benzoyl peroxide | 10 |
| tert Butyl perbenzoate | 20 | was placed in a one gallon Patterson Kneadmaster mixer. Steam was blown through the jacket (100° C.) to initiate the reaction. The thin slurry gradually thickened until a rubbery stage was obtained at which time (40–45 minutes) the mix crumbled and was dumped into a pan for final cure in a 120° C. oven (2 hours). Peak exotherm during the oven cure was 190–195° C. (2- to 3-inch thick bed). The cured composition was finely ground in a ball mill before compounding. Acetone extraction showed that 86% of the DAC monomer had been converted to the insoluble gelled state.

A molding compound was prepared as follows: The ingredients,

| | Parts |
|---|---|
| Dapon 35 | 875 |
| Acetone | 800 |
| Ground gelled composition | 250 |
| t-Butyl perbenzoate | 20 |
| Glass fibers (¼″) | 900 |
| Calcium silicate powder | 175 |
| tris(Methoxyethyl)vinyl silane | 12 |
| Calcium stearate | 20 | were combined in a Patterson sigma blade mixer and blended until all ingredients were thoroughly wetted.

The material was then removed from the mixer, spread on trays, and dried for 4 hours in a forced air oven at 50° C. It was then compounded into a powder as in Example 1 and performed in substantially the same manner.

EXAMPLE 4

One-step preparation of gel of Example 3

Example 3 was repeated but with steam in mixer jacket at 150° C. Mixing was continued through the rubbery stage and reached a crumbled solid mass in a total mixing time of about 20 minutes. The product was removed from the mixer, cooled, and ground in a ceramic ball mill to a 200 mesh particle size. Extraction with acetone showed that 82% of the monomer had been converted to an insoluble condition.

The ground material was compounded as in Example 1 and showed similar behavior.

EXAMPLE 5

Example 4, with the diallyl ester of the adduct of hexachlorocyclopentadiene and tetrahydrophthalic acid Example 4 was repeated, using the diallyl ester of the tetrahydrophthalic-hexachlorocyclopentadiene adduct in place of diallyl chlorendate. Molding qualities were good.

EXAMPLE 6

Dapon M

The following ingredients were combined in a Patterson Kneadmaster mixer:

| | Parts |
|---|---|
| Commercial prepolymer of diallyl isophthalate (Dapon M) | 875 |
| Acetone | 700 |
| Glass fibers (¼ inch) | 900 |
| Calcium silicate powder | 125 |
| t-Butyl perbenzoate | 20 |
| tris(Methoxyethyl)vinyl silane | 12 |
| Ground gelled composition of Example 4 | 300 |
| Calcium stearate | 20 |

The composition was mixed until all fillers were thoroughly wetted, then spread on trays to allow the acetone solvent to evaporate.

It was then milled on a heated two-roll rubber mill. Compounding characteristics were excellent and a uniform sheet could be stripped cleanly from the mill in about three minutes. The sheet was cooled, ground to a 10 mesh powder. This powder showed no signs of blocking when subjected to prolonged storage at temperatures as high as 95° F.

Molding qualities were excellent, exhibiting no sticking or tendency to foul the mold.

EXAMPLE 7

A molding compound was prepared as in Example 3, except that a higher level of the flame retardant was employed. No mineral filler (calcium silicate) was employed in the compound and instead the amount of gelled composition was increased to 425 parts. Compounding and molding qualities were again excellent and the level of flame resistance was substantially increased.

The compounding and molding characteristics, the measure of flame retardancy, and one important electric property (loss factor) are shown for each of the examples in the following table:

TABLE

| | Example | | | | | | | |
|---|---|---|---|---|---|---|---|---|
| | 1 | A | 2 | 3 | 4 | 5 | 6 | 7 |
| Milling time, min | 2.5 | 7 | 2.5 | 3 | 3 | 3 | 3 | 2.5 |
| Blocking | None | Yes | None | None | None | None | None | None |
| Mold fouling | None | Yes | None | None | None | None | None | None |
| Ignition time, sec [1] | 92 | 88 | 90 | 93 | 90 | 98 | 89 | 92 |
| Burning time, sec [1] | 41 | 77 | 35 | 37 | 37 | 46 | 33 | 21 |
| Loss factor at 200° C., percent | 0.6 | 1.1 | 0.71 | 0.77 | 0.79 | 0.85 | 0.42 | 0.60 |

[1] Federal Test Standard LP406, Test Method 2023.

The table illustrates the unexpected advantages of this invention. Comparing Examples 1 and A, milling time is reduced, blocking and mold fouling eliminated. The ignition time is just noticeably affected; but the burning time before self-extinction is reduced from 77 seconds to 41 seconds. And this is done while retaining a low loss factor with the technique of this invention, while the use of the prior art technique results in a loss factor substantially 50% higher, despite the poorer flame retardancy.

The use of high levels of flame-retardant additive, without the loss in electricals, is illustrated in Example 7. When substantially higher levels are used, however, electrical properties begin to be lost, so that we prefer not to go over about 10% of gelled chlorine-containing resin, and 10% antimony oxide.

Obviously, the examples can be multiplied indefinitely without departing from the scope of the invention as defined in the claims.

What is claimed is:

1. A composition suitable for improving the flame retardance of diallylic phthalate resinous molding compositions consisting essentially of an insoluble polymer of a diallyl ester of a Diels-Alder adduct of hexachlorocyclopentadiene and an unsaturated dibasic carboxylic acid selected from the group consisting of maleic and tetrahydrophthalic anhydride, insolubilized in the presence of antimony oxide and intimately admixed with the antimony oxide, the antimony oxide being present in a ratio of 50 to 150 parts by weight per 100 parts of the polymer, the entire composition being in particulate form.

2. The composition of claim 1 in which the insoluble polymer is derived from diallyl chlorendate.

3. The composition of claim 1 in which the insoluble polymer is derived from the diallyl ester of 1,2,3,4,9,9-hexachloro - 1,4,4a,5,6,7,8,8a - octahydro-1,4 - methanonaphthalene-6,7-dicarboxylic anhydride.

4. A flame-resisting diallyl phthalate molding composition characterized by good flame retardance and good electrical properties, comprising a diallyl phthalate prepolymer, filler, an insoluble polymer of a diallyl ester of a Diels-Alder adduct of hexachlorocyclopentadiene and maleic or tetrahydrophthalic anhydride converted to the insoluble state in the presence of antimony oxide, the ratio of antimony oxide to insolubilized polymer being in the range of 50 to 150 parts by weight per 100 parts of insolubilized polymer, and the amount of insolubilized polymer being from 2 to 10% of the composition and the amount of antimony oxide being from 1% to 10% of the composition.

5. The composition of claim 4 in which the insoluble polymer is derived from diallyl chlorendate.

6. The composition of claim 4 in which the insoluble polymer is derived from the diallyl ester of 1,2,3,4,9,9-hexachloro - 1,4,4a,5,6,7,8.8a - octahydro-1,4 - methanonaphthalene-6,7-dicarboxylic anhydride.

7. The composition of claim 4 in which the diallyl phthalate prepolymer is derived from diallyl orthophthalate.

References Cited

UNITED STATES PATENTS

| | | |
|---|---|---|
| 2,810,712 | 10/1957 | Baranauckas _____ 260—41 |
| 3,093,619 | 6/1963 | Taylor. |
| 3,110,694 | 11/1963 | Willersinn. |
| 3,162,609 | 12/1964 | Eichhorn. |
| 3,196,191 | 7/1965 | Haigh et al. _____ 260—869 |

MORRIS LIEBMAN, Primary Examiner

SAMUEL L. FOX, Assistant Examiner

U.S. Cl. X.R.

106—15; 252—8.1; 260—869